Figure 1:
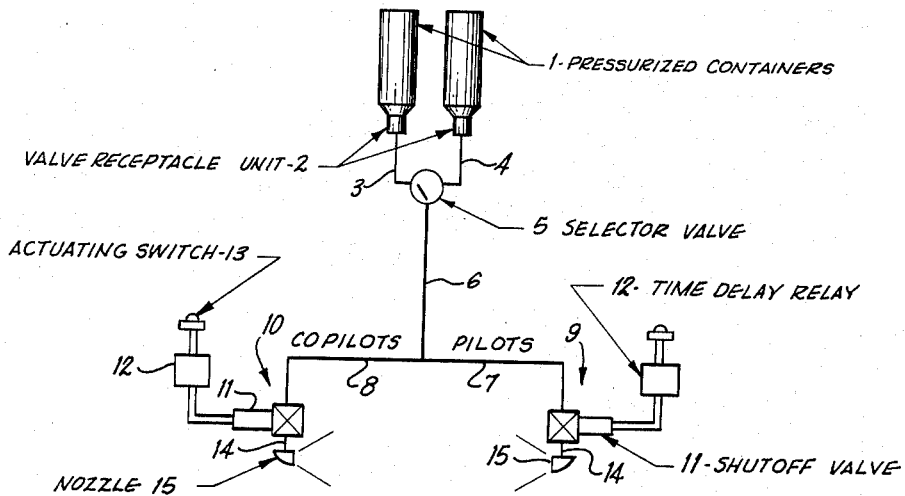

Jan. 25, 1966 K. GUNNAR ETAL 3,231,196
RAIN REPELLENT APPLICATION SYSTEM FOR AN AIRCRAFT WINDSHIELD
Filed Dec. 26, 1963

INVENTORS
GEORGE W. BROOKS
JOHN S. DEBROTNIC
KEITH GUNNAR
CLIFFORD M. HANSEN
JOSEPH KALOCSAY
HARTWELL G. STOLL

BY L E Carnahan
AGENT

United States Patent Office 3,231,196
Patented Jan. 25, 1966

3,231,196
RAIN REPELLENT APPLICATION SYSTEM FOR AN AIRCRAFT WINDSHIELD
Keith Gunnar, Bellevue, and Hartwell G. Stoll and John S. Debrotnic, Seattle, Wash., Clifford M. Hansen, Costa Mesa, Calif., George W. Brooks, Slidell, La., and Joseph Kalocsay, Huntsville, Ala., assignors to The Boeing Company, Seattle, Wash., a corporation of Delaware
Filed Dec. 26, 1963, Ser. No. 333,358
4 Claims. (Cl. 239—70)

The invention relates to removing rain or water from vehicle windshields, and more particularly to a rain repellent application system for aircraft.

One of the old problems of aircraft operation is that of inadequate visibility when flying in heavy rain. The problem has become more acute with modern jet aircraft operations. The most common method of removing rain from aircraft windshields has been with mechanical wipers. Most aircraft wiper configurations are similar to automative wipers except that they operate at a faster rate and exert greater blade pressure against the windshield.

Windshield wipers have two basic problems. One is the tendency of the slip-stream aerodynamic forces to reduce the wiper blade loading pressure on the windshield, causing ineffective wiping or streaking. The other is in achieving fast enough wiper oscillations to keep up with the high rates of rain impingement during heavy rainfalls. Although theoretically there is no limit to the oscillation rate, from a practical standpoint a limit is reached where the power consumption and mechanical design requirements become prohibitive. As a result, most aircraft wiper systems fail to provide satisfactory vision in heavy rains.

With the advent of turbine powered aircraft, a pneumatic rain removal system became feasible. This method utilizes high pressure, high temperature, engine compressor bleed air which is blown across the windshields. As long as enough hot air is available, this method is quite effective, even in heavy rains. During take-off and climb, adequate bleed air is available to provide good rain clearance. However, during approach and landing, the engines are normally at a low power setting which reduces the bleed air pressure and temperature available for windshield rain removal. Thus when vision is most critical, that is, during the landing sequence, the systems performance is at its worst. The pneumatic rain removal system often adds considerable cost and weight to the aircraft as compared with that of wipers, and the use of engine bleed air during take-off entails a thrust loss penalty. Furthermore, blowing hot air across glass windshields has caused window breakage, and can soften the plastic interlayer which reduces the ability of the windshield to withstand bird impacts.

A third method of windshield rain removal involves the use of chemical rain repellents. When water is poured onto a sample of normal clean glass, particularly when freshly washed, the water spreads out evenly on the glass. If the bulk of the water is removed by shaking, tilting, or blowing air, the glass remains wetted by a thin film of water. However, when the glass is treated with certain types of chemicals, a transparent molecular film is formed which greatly reduces the adhesive force between the water and the glass. Water will then behave very much as mercury does on glass and will draw up into beads that cover only a portion of the glass. The area between the beads is dry. The water is readily removed from the glass by shaking, tilting, or blowing air, leaving the glass dry. This principle lends itself naturally to removing rain from aircraft windshields. The high velocity slip stream across the window continually removes the water beads leaving a large percentage of the window (between drops) dry. The pilot can get good visibility because the eye can "integrate" over the wet and dry areas.

Although chemical rain repellent (which generally gives better overall vision in rain than do either wipers or pneumatic rain removal systems) have been available for more than a decade, their use has been quite limited. The prior known repellents have the following disadvantages:

(1) Could only be applied manually on the ground. The approximate length of time required for application varied from 5 minutes to 1 hour, depending upon the type of repellent.

(2) Could not be applied to a window exposed to rain. This requires either moving the airplane into a hangar in adverse weather to permit repellent application or shielding the windshield from rain with hoods or deflectors.

(3) The repellent coating could be eroded away by flying through snow or ice crystals. Even if good maintenance was established for applying repellent on the ground, there was no guarantee that the repellent would still be effective throughout the next flight, and particularly during landing.

(4) Once in the air, if the pilot were to find the repellent ineffective, either because of inadequate maintenance or because of erosion by ice crystals, there would be no way to restore repellency.

A new concept of rain repellent fluid that overcomes the above stated disadvantages of the prior known rain repellents and permits application while flying in rain has been developed by the assignee of this invention. This new repellent is squirted onto the exterior of the windshield and uses the rain itself as the carrying agent to distribute the chemicals over the windshield surface.

Since this new concept of rain repellent fluid is not part of this invention, the specific details thereof are deemed unnecessary. However, the repellent was tested under a wide range of rain intensities and air velocities, and under various lighting conditions during the day and night with satisfactory performance. The rate of degradation of the newly found rain repellent fluid is basically a function of rain impingement; that is, it is dependent upon both air speed and rain intensity. This invention provides an application system for this newly found rain repellent fluid which requires a mimimal of the pilot's time in applying the repellent and which provides an in-flight system for applying the repellent as often as the rain conditions require.

Therefore, it is an object of this invention to provide an in-flight rain repellent application system for aircraft windshields.

Another object of the invention is to provide an in-flight rain repellent application system for aircraft wherein the application of the repellent can be repeated.

Another object of the invention is to provide a rain repellent application system utilizing spray type nozzles and disposable pressurized repellent containers.

Another object of the invention is to provide a rain repellent application system utilizing a plurality of pressurized repellent containers and means for directing a predetermined amount of repellent from any one of the containers to a point of use.

Figure 2:
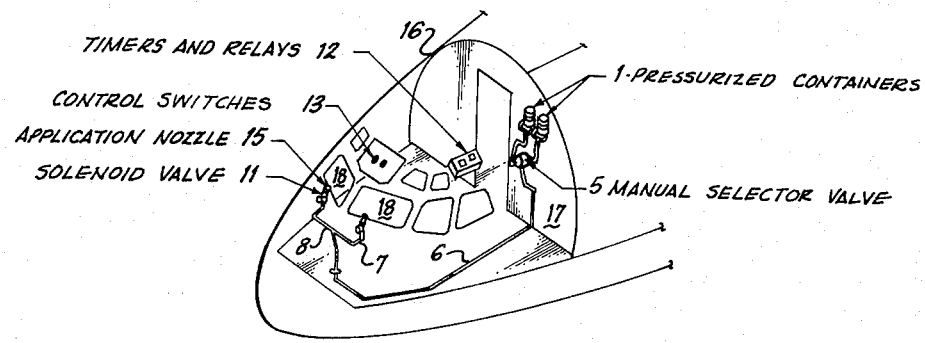
Figure 3:
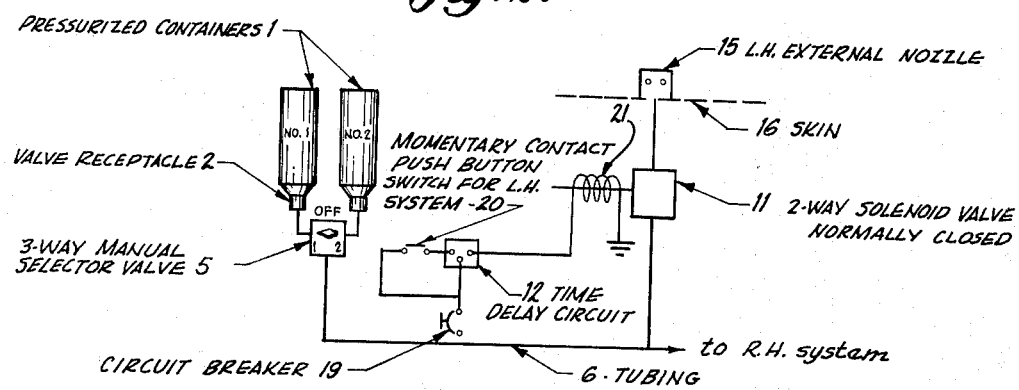

Other objects of the invention not specifically set forth above will become readily apparent from the following description and drawings in which:

FIGURE 1 is a schematic view of the invention;
FIGURE 2 is a schematic view showing the invention mounted in an aircraft; and
FIGURE 3 is a schematic view of the controls of the rain repellent application system shown in FIGURE 2.

With the development of the above stated rain repellent fluid, it became necessary to provide an application system therefor which would, at the pilot's or copilot's command, direct a measured amount of the fluid to a given area of the windshield within certain velocity limits, which requirements are fulfilled by this invention.

Referring now to the drawings, the system shown in FIGURE 1 comprises two pressurized cans or containers 1 being of the disposable type and holding approximately 1 pint of fluid. Containers 1 provide for a dual supply of repellent fluid which contain the energy required to propel the fluid through the system. Operatively connected with each pressurized container 1 is a can valve and receptacle unit 2 which allows for the replacement of the cans 1 without the loss of system fluid and without the possibility of introducing contamination such as moisture or other foreign matter, into the system. Units 2 may be of the type described and claimed in U.S. patent application Serial No. 303,324, filed August 20, 1963, and assigned to the same assignee. Each of can valve and receptacle units 2 are connected via conduits 3 and 4 to a selector valve 5 which provides the option of selecting either of cans or containers 1 to pressurize the system. Upon the depletion of the fluid from one of the cans, the other can may be put on the line 6 and the empty can replaced. Valve 5 may also be turned to an off position in which case both cans 1 are isolated from the system. Line 6 divides into two branches 7 and 8, branch 7 leads to the pilot's controls 9 while branch 8 leads to the copilot's controls 10.

Pilot's controls 9 and copilot's controls 10 are identical and therefore will be given corresponding reference numerals. Controls 9 and 10 each comprises of a solenoid operated shutoff valve 11, a time delay relay 12, an actuating switch 13, and the interconnecting signal circuit. Upon actuation of the valve 11 via switch 13 and relay 12 fluid is allowed to pass through conduit 14 and nozzle 15 to the associated windshield or other point of use. Nozzle 15 directs the fluid at the desired angle and velocity so as to strike the proper locations on the windshield and provide maximum coverage of the repellent on the windshield area. The specific aircraft nose and windshield configuration and flight factors determine the nozzle configuration and design. The time delay relays 12 allow a timed signal impulse to actuate the solenoid valve. By means of the timed impulse the quantity of fluid that passes through the valve is controlled. The preferred volume of rain repellent applied is approximately 5 cc. to 8 cc. per squirt per window, and which squirt requires a duration of a precise time, for example, 0.17–0.30 second, depending on the nozzle and system configuration utilized. Actuating switches 13 allow the pilot or copilot to apply repellent to either windshield. However, time delay relays 12 limit the amount of repellent each time either switch 13 is actuated. Thus it is only necessary to actuate the switch 13, thereby minimizing the time required by either the pilot or copilot to actuate the system, which time is essential during flight operations such as the landing sequence. However, more sophisticated and expensive time delay relays may be effectively utilized with the present invention, if desired.

Referring now to FIGURES 2 and 3 which show a specific application of the invention on a Boeing 727 Aircraft, like reference numerals where applicable are utilized.

As shown in FIGURE 2, the rain repellent application system of the invention is mounted in the control cabin of aircraft 16 wherein pressurized repellent cans or containers 1, the associated valve and receptacle units 2 and selector valve 5 are mounted on compartment wall 17 of aircraft 16. Solenoid actuated shutoff valves 11 and application nozzles 15 are mounted in the fuselage with nozzles 15 being positioned in the desired position with respect to windshields 18. Valves 11 are connected with the selector valve 5 via line 6 and branches 7 and 8. The time delay relays 12 are shown as a control box and located in the upper left hand side of the control cabin of aircraft 16 while the control push button actuating switches 13 are located above the windshields 18, the electrical circuit between switches 13, relays 12 and solenoid actuated valves 11 being shown in FIGURE 3.

FIGURE 3 shows the electrical control circuit for the left hand or pilot's control, the right hand or copilot's control circuit being identical. Power is supplied from the aircraft electrical power supply (not shown) through circuit breaker 19 when said breaker 19 is closed. Pushing button 20 of actuating switch 13 closes the circuit to actuate solenoid 21 of shutoff valve 11 which opens valve 11 wherein rain repellent under pressure from can 1 is forced through the holes in nozzle 15 onto windshield 18, nozzle 15 being positioned adjacent the skin 22 of aircraft 16. At the moment button 20 is initially pushed and the circuit to solenoid 21 is closed, time delay relay 12 is activated so that the circuit to solenoid 21 is opened after a predetermined time lapse. Time delay relays are well known in the electrical art and the details thereof are not deemed necessary to understand the invention. The time lapse utilized in each different application of the invention will be determined for the specific application thereof. An adjustable time delay feature (not shown) provides a means for varying the amount to accommodate different designs.

While time delay relays are preferred, other means for controlling the quantity of fluid may be utilized such as mechanical accumulators, flow meter or flow limiting devices.

Two types of repellent fluid have been developed, one primarily for use on glass windshields in conjunction with windshield wipers, and another that is effective on both plastic and glass windshields and can be used in conjunction with either wiper or pneumatic systems or without any other rain removal equipment. Therefore, the application of this invention would be determined by the type of repellent utilized and the additional rain removal equipment required, if any.

It has thus been shown that this invention provides an effective application system for supplying rain repellent fluid to a windshield under a wide range of rain intensities and air velocities, thus overcoming the disadvantages of the prior known rain removal systems.

Although a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What we claim is:

1. A fluid rain repellent application system for an aircraft windshield comprising, a pressurized fluid container having pressure energy to propel a chemical rain repellent through the system and onto the exterior of an in-flight aircraft windshield, a valve and receptacle unit operatively connected to said container for allowing removal and replacement of said pressurized fluid container without contamination or loss of the system repellent fluid, solenoid actuated valve means operatively connected to said container through said valve and receptacle unit for controlling pressurized fluid flow from said container means to the system, nozzle means mounted to the exterior of said aircraft with respect to an associated windshield and operatively connected to said container through said solenoid actuated valve means for directing pressurized fluid flow from said container means onto the exterior of an aircraft windshield such that the rain acting as the carrying agent and the slipstream velocity distributed said rain repellent fluid over said windshield surface, time delay means operatively connected to said solenoid actuated valve means for limiting the quantity of fluid flow through said solenoid actuated valve means to said nozzle means such that approximately 5 cc. to 8 cc. within approximately 0.17 to 0.30 second is applied to the exterior of said windshield, and pilot controlled switch means for actuating said time delay means whereby said time delay means allows a timed signal impulse to actuate said solenoid valve means for applying a predetermined amount of pressurized fluid from said container means onto the exterior of the windshield each time said pilot controlled switch is actuated.

2. A fluid rain repellent application system for an aircraft windshield comprising, a plurality of pressurized fluid containers having pressure energy for providing fluid propelling force required for said system connect-disconnect means operatively connected to each of said containers for allowing removal and replacement thereof without contamination nor loss of the system pressurized fluid, a multi-way selector valve means operatively connected to said pressurized containers through said connect-disconnect means for selectively supplying or shutting-off all pressurized fluid flow or for selectively supplying pressurized fluid flow from any one of said containers to the system, a pair of solenoid actuated valve means operatively connected to said multi-way valve means, for controlling pressurized fluid flow from said containers to the system, at least one nozzle means operatively connected to each of said solenoid actuated valve means for directing pressurized fluid onto the exterior of an associated windshield, time delay relay means operatively connected to said solenoid actuated valve means for allowing the duration of a precisely timed signal impulse to actuate said solenoid valve thereby limiting the quantity of fluid flow through said solenoid actuated valve means to said nozzle means, and pilot controlled switch means for actuating said time delay means whereby said time delay relay means limits the amount of pressurized fluid applied onto the exterior of the windshield, each time said pilot controlled switch is actuated.

3. A fluid rain repellent application system for an in-flight aircraft windshield exposed to rain and a high air velocity slipstream, said system comprising a plurality of pressurized fluid containers having pressure energy to propel a chemical rain repellent fluid through the system and onto the exterior of an in-flight aircraft windshield, a valve and receptacle unit operatively connected to each of said containers for allowing removal and replacement thereof without contamination or loss of the system repellent fluid, a multi-way selector valve means operatively connected to said containers, through said valve and receptacle unit for selectively supplying or shutting-off all pressurized fluid flow or for selectively supplying pressurized fluid flow from any one of said containers to the system, solenoid actuated valve means operatively connected to said containers through said selector valve means for controlling pressurized fluid flow from said containers to the system, spray nozzle means operatively connected to said containers through said solenoid actuated valve means and positioned adjacent the skin of the aircraft with respect to an associated windshield for directing pressurized fluid flow from said containers onto the exterior of said windshield, time delay means operatively connected to said solenoid actuated valve means for limiting the quantity of fluid flow through said solenoid actuated valve means to said nozzle means, and pilot controlled switch means for actuating said time delay means whereby said time delay means allows a timed signal impulse to actuate said solenoid valve means for applying a predetermined amount of pressurized fluid from said container means onto the exterior of the windshield.

4. A fluid rain repellent application system for an in-flight aircraft windshield exposed to rain and a high air velocity slipstream, said system comprising, a pressurized fluid container having pressure energy to propel a chemical rain repellent fluid through the system and onto the exterior of an in-flight aircraft windshield during rain impingement thereon, connect-disconnect means operatively connected to said container for allowing removal and replacement of said container without contamination or loss of the system repellent fluid, nozzle means for directing pressurized fluid flow from said container means onto the exterior of said in-flight aircraft windshield, said nozzle means being mounted adjacent the exterior skin of the aircraft with respect to an associated windshield and positioned for providing maximum coverage of said repellent fluid that uses rain as the carrying agent for distribution over said windshield surface, valve means for controlling pressurized fluid flow from said container means to said nozzle means, time delay means operatively connected to said valve means for controlling the volume of rain repellent fluid from approximately 5 cc. to 8 cc. within a time period of approximately 0.17 to 0.30 second through said valve means and said nozzle means to said windshield, and switch means for actuating said time delay means whereby said time delay means limits the amount of pressurized fluid applied onto the exterior of the windshield, each time said pilot controlled switch is actuated.

References Cited by the Examiner
UNITED STATES PATENTS

| | | | |
|---|---|---|---|
| 2,862,765 | 12/1958 | Wing | 239—303 |
| 2,914,256 | 11/1959 | O'Shei | 239—305 |
| 2,943,797 | 7/1960 | Neilson | 239—305 |
| 3,027,094 | 3/1962 | Phillips | 239—70 |
| 3,044,276 | 7/1962 | Kauten | 239—304 |

M. HENSON WOOD, Jr., *Primary Examiner.*

EVERETT W. KIRBY, *Examiner.*